March 6, 1928.  
A. F. GANTZ  
ICE CREAM BRICK CUTTER  
Filed Dec. 15, 1924  
1,661,533  
6 Sheets-Sheet 3
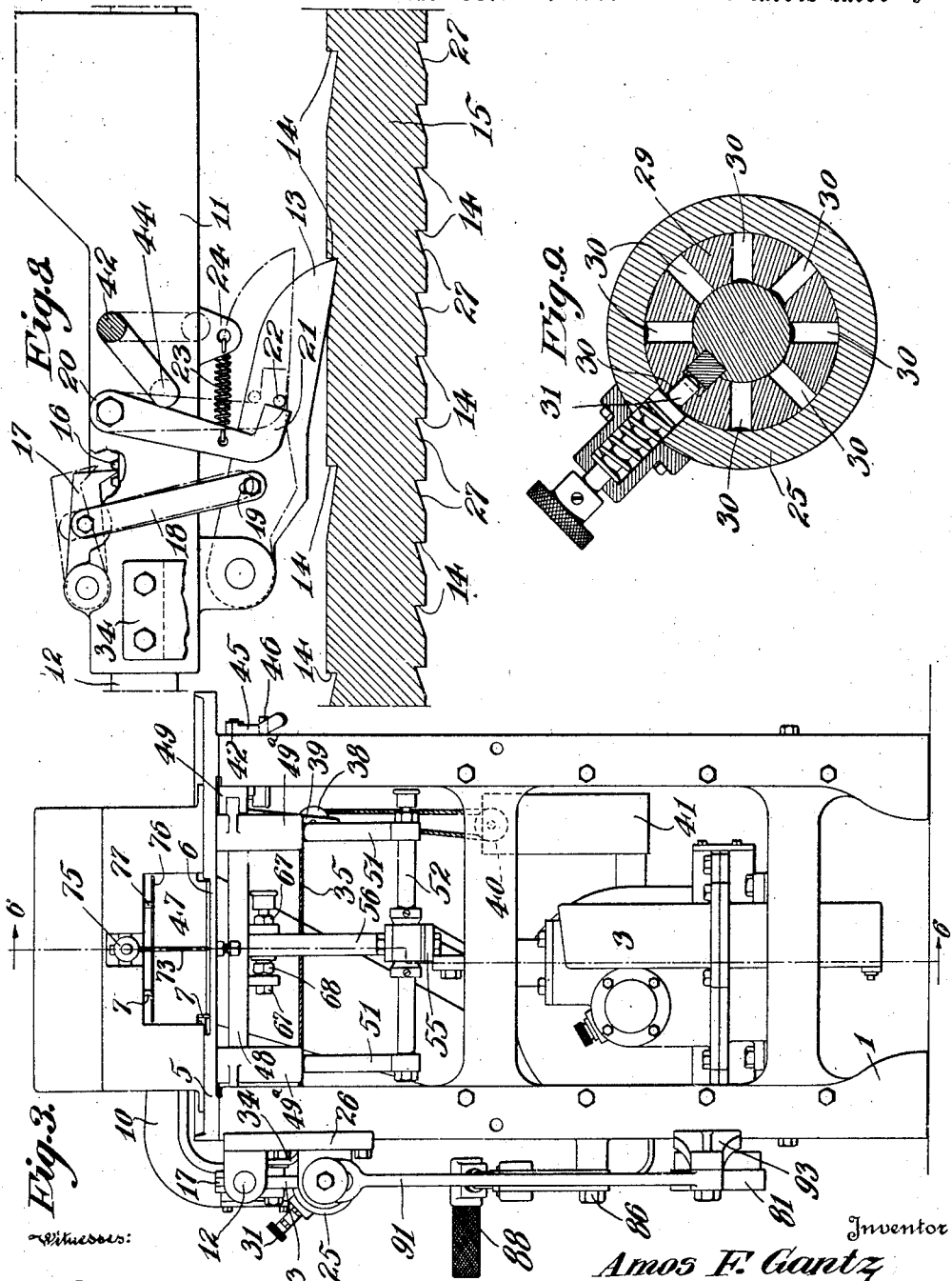

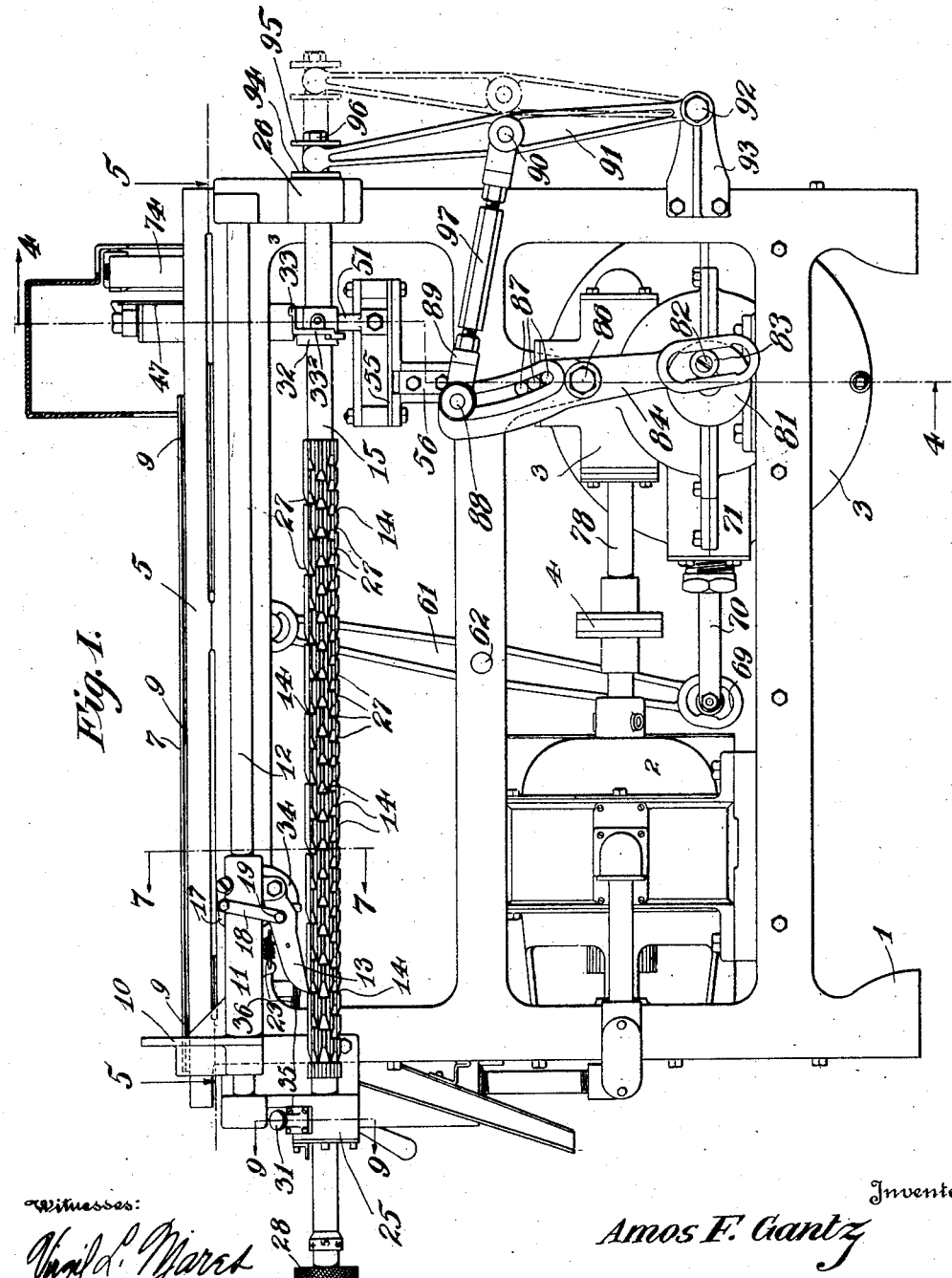

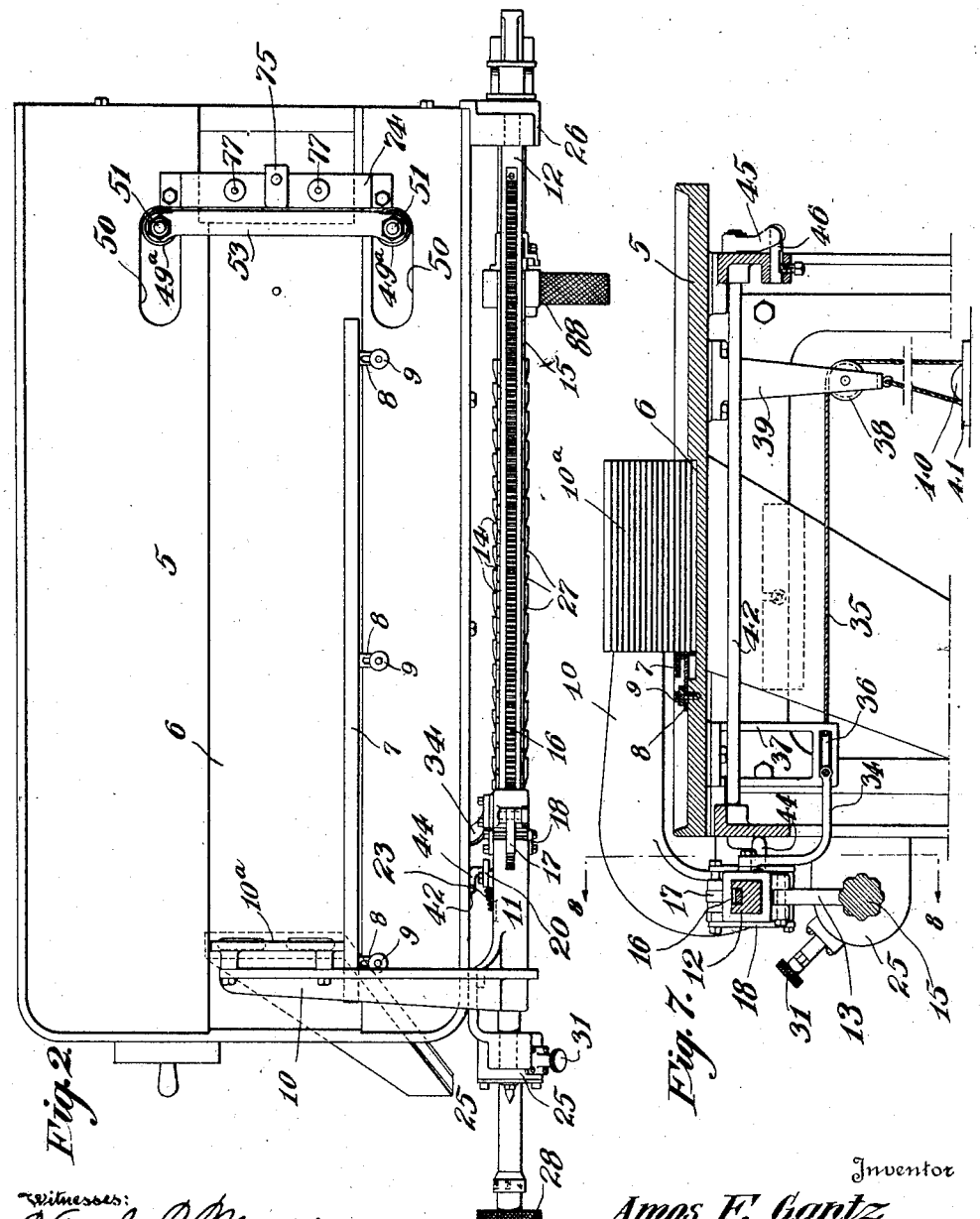

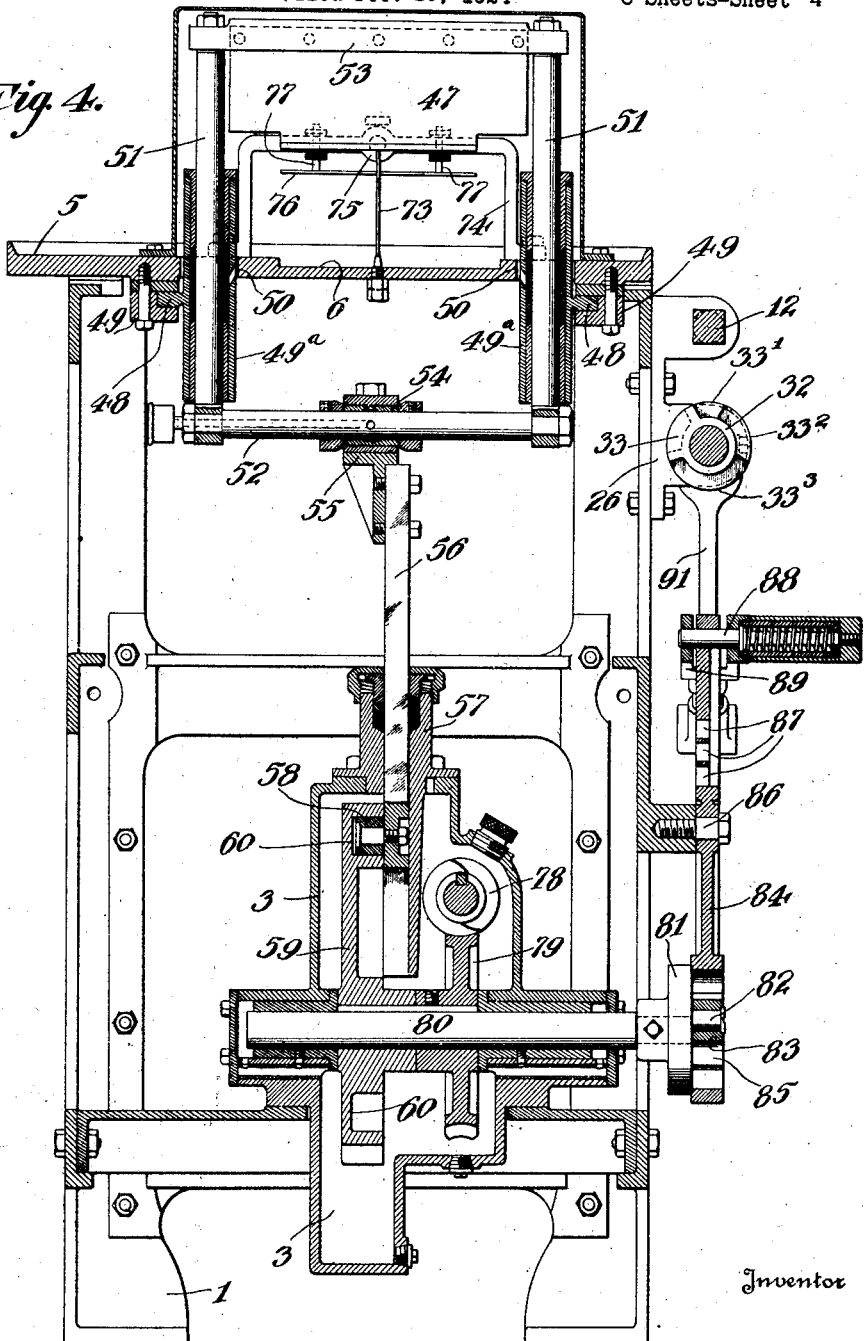

March 6, 1928.
A. F. GANTZ
1,661,533
ICE CREAM BRICK CUTTER
Filed Dec. 15, 1924
6 Sheets-Sheet 5
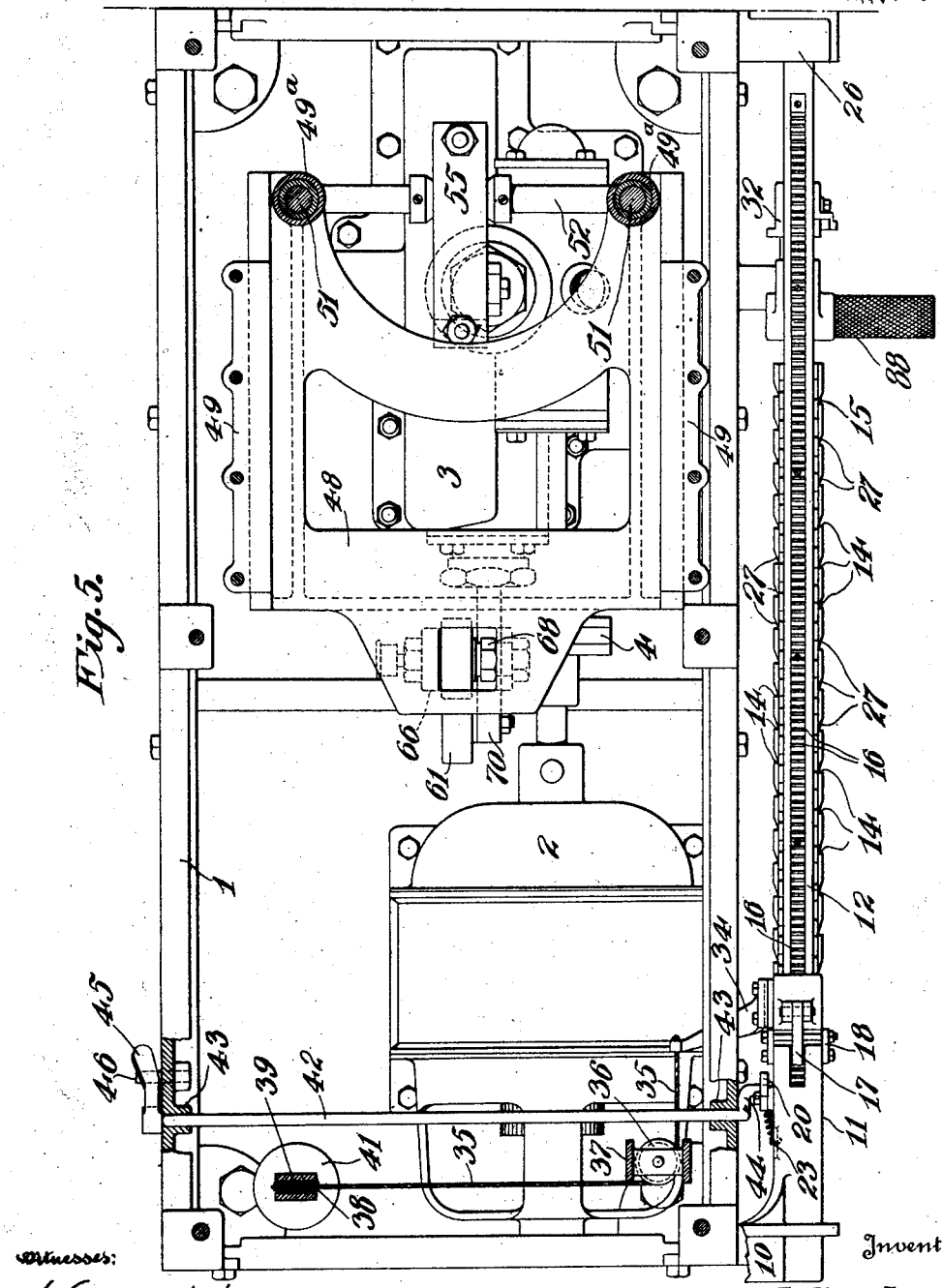
Witnesses:
Virgil L. Mares
George A. Gruss
Inventor
Amos F. Gantz
By Joshua R. H. Potts
His Attorney March 6, 1928.
A. F. GANTZ
1,661,533
ICE CREAM BRICK CUTTER
Filed Dec. 15, 1924      6 Sheets-Sheet 6
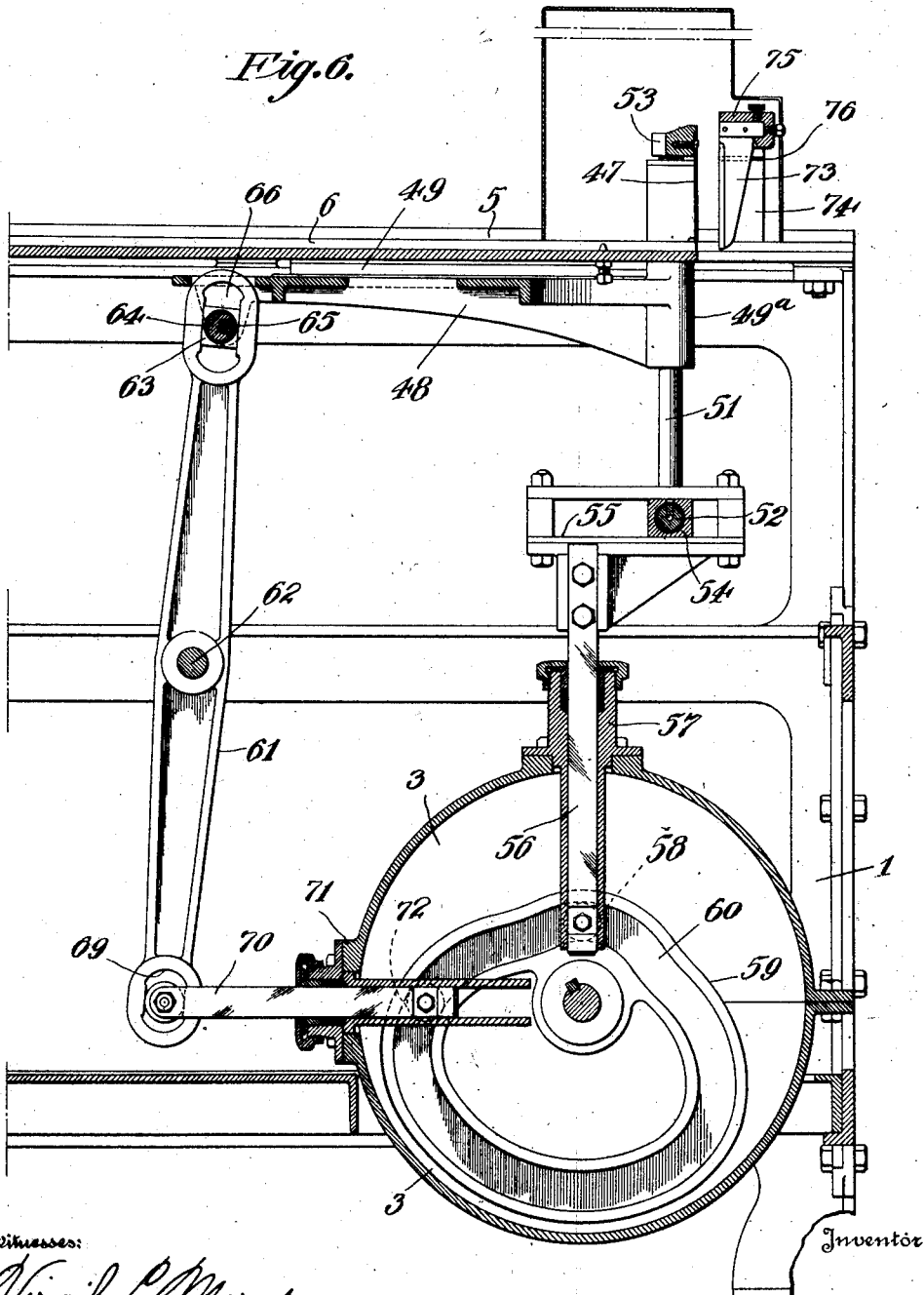

Patented Mar. 6, 1928.

1,661,533

UNITED STATES PATENT OFFICE.

AMOS F. GANTZ, OF CEDAR RAPIDS, IOWA.

ICE-CREAM-BRICK CUTTER.

Application filed December 15, 1924. Serial No. 756,063.

The objects of the invention are to provide simple and efficient mechanism whereby ice cream slabs may be rapidly and accurately cut into bricks or slices of any desired size with the minimum amount of attention from the operator.

The invention includes means for feeding the slabs to the cutting knives; means for adjusting the table for different widths of slabs; means for imparting intermittent motion to the slab; means whereby the travel of the slab at each motion may be varied at will; a transverse cutting knife; one or more splitting knives; means for imparting vertical motion to the transverse cutting knife for severing the slab and for imparting horizontal motion whereby the transverse knife will push the severed blocks into range of the splitting knife or knives, and means for automatically returning the slab feeding means to starting position.

These objects, and other advantageous ends which will be described hereinafter, I attain in the following manner, reference being had to the accompanying drawings in which Figure 1 is a side elevation of a machine constructed in accordance with my invention, Figure 2 a plan view of the machine shown in Figure 1, Figure 3 a right end view of the machine shown in Figure 1, Figure 4 an enlarged section on line 4—4 of Figure 1, Figure 5 a fragmentary enlarged section on line 5—5 of Figure 1, Figure 6 an enlarged fragmentary section on line 6—6 of Figure 3, Figure 7 an enlarged fragmentary section on line 7—7 of Figure 1, Figure 8 an enlarged fragmentary section on line 8—8 of Figure 7, and Figure 9 an enlarged section on line 9—9 of Figure 1.

In the drawings, 1 indicates the frame of the machine, 2 a motor which furnishes the power, 3 a gear case which encloses the gearing and cam by which the tranverse cutting knife and the feeding means are actuated, 4 a flexible coupling connecting the motor with the gear case, 5 the table upon which the slab travels, 6 a channel by which the slab is guided, 7 an adjustable guide bar extending lengthwise of the channel whereby the effective width of the channel may be varied to adapt the machine to deal with molds of different width, 8 slotted plates extending from the guide bar and adapted to be held in adjusted position by means of thumb screws 9, 10 the pusher arm by which the ice cream slab is caused to travel and which is preferably provided with a wood facing 10$^a$ where it contacts with the slab, 11 a rectangular sleeve integral with or fixed to the pusher arm and adapted to slide on a rectangular guide arm 12 extending lengthwise of the machine and 13 a ratchet pawl pivoted to the under side of the sleeve and adapted to be engaged by shoulders 14 on a feed arm 15 extending lengthwise of the machine and shown as octagonal in cross section. The upper face of guide arm 12 is provided with a rack 16 adapted to be engaged by a pawl 17, pivotally mounted on the sleeve, to prevent rearward movement of the pusher arm. A link 18 pivoted to pawl 17 has a slot and pin connection with ratchet pawl 13, as indicated at 19, and serves to lift pawl 17 out of engagement with rack 16 when the ratchet pawl is disengaged from the feed arm. A dog 20 pivoted to sleeve 11 has an angularly extending lug 21 adapted to engage a pin 22, extending from ratchet pawl 13, when the pawl is in engagement with a notch. The dog is connected by a spring 23 with a lug 24 depending from the sleeve and the dog is held in engagement with pin 22 so long as the ratchet pawl is in contact with the feed arm. When the ratchet pawl is lifted from the feed arm to permit a return movement, the face of the lug is released from engagement with pin 22 and the spring causes the lug to take under the pin and thereby hold the ratchet pawl out of engagement, as indicated by dotted lines in Figure 8.

Movement is imparted to ratchet pawl 13 and consequently to the pusher arm by reciprocating longitudinal movement of feed arm 15 which is slidably and rotatably mounted in bearings 25 and 26 on the frame. The feed arm is provided with series of spaced notches disposed in longitudinal alignment. In the drawing, 8 series are shown. Each notch has an inclined face 27 and a vertical face, before referred to as shoulder 14, with which the ratchet pawl may engage. One series of notches is spaced to provide for the longest required movement of the pusher arm such, for instance as the movement required for propelling the slab to a point at which the transverse knife will sever a quart from the forward end of the slab. The remaining series are graduated to cause shorter movement of the pusher arm than that caused by the first series such as one half, one fourth, etc. Rotary movement, to bring any of the series into alignment with the ratchet pawl, is imparted by a knurled knob 28 on the rear end of the feed arm. A hub 29 splined upon a cylindrical part of the feed arm and rotatably mounted in bearing 25 is provided with a series of radial holes 30, one for each series of notches, spaced to register with the respective series, and the bearing carries a spring pressed pin 31 adapted to engage in a selected hole and lock the feed arm against rotation. A collar 32 fixed to the feed arm has a series of steps or shoulders 33, 33¹, 33², and 33³, arranged in different positions relatively to the axial length and the periphery of the collar, and adapted to engage the ratchet pawl after it reaches the limit of its forward movement thereby causing the pawl to be lifted out of contact with the feed arm and into the dotted line position shown in Figure 8 where it will be held by pin 22 and dog 20. When the feed arm is rotated to bring a different series of notches into alignment with the ratchet pawl, the collar will also be rotated to bring a different shoulder into alignment with the ratchet pawl. The arrangement is such that when the ratchet pawl is being advanced by comparatively short strokes it will engage an advanced shoulder, the shoulder being brought into engagement by the rearward movement of the reciprocating feed arm, and when the pawl is being advanced by longer strokes, it will be engaged by a more remote shoulder. As the collar is fixed to the feed arm, adjustment of the feed arm to bring a different series of notches into action adjusts the collar to bring the proper shoulder into operative position. When the ratchet pawl is lifted, pawl 17 which holds the pusher arm against rearward movement is thrown out of engagement with rack 16 and the pusher arm and ratchet pawl are free to move rearwardly. An elbow 34 fixed to sleeve 11 has a rope or cable 35 secured to its free end. The rope passes over a sheave 36 mounted in a bracket 37 depending from the frame, over a sheave 38 mounted in a bracket 39 then over a sheave 40 carrying a counter-weight 41, and its end is secured to bracket 39. As the pusher arm is advanced the elbow arm is also advanced thereby causing the counter-weight to be raised. When the ratchet pawl is lifted and ratchet 17 disengaged, the counter-weight automatically returns the pusher arm to its starting position.

A rod 42 rotatably mounted in bearings 43 on the frame has at one end a crank arm 44 and at the other end a laterally extending finger 45. Rod 42 is so positioned that with crank arm 44 in its full line position, as shown in Figure 8, the crank arm will be engaged by dog 20 as the ratchet pawl reaches the limit of its rearward movement. The rearward movement of the dog will thereby be arrested, pin 22 freed from the dog and the ratchet pawl will be allowed to drop into its active position. The crank arm may be locked in its active position by a pin 46 engaged by finger 45. If it is desired that the ratchet pawl be held in idle position at the end of its return movement the pin may be slid out of engagement with the finger and the crank arm will drop to its idle position shown in dotted lines.

The knife 47 which is designed for cutting the slab transversely has a vertical reciprocating motion for cutting purposes and a horizontal reciprocating motion for pushing the transversely severed pieces into range of the splitting knife or knives. With this in view I provide a frame 48, hereinafter called the cutter frame, which is slidable in bearings 49 in the frame of the machine. The cutter frame carries on each side a vertically disposed guide 49ª, shown as of tubular form, which extend through a slot 50 in the table, and clear of the mold channel. Plunger rods 51, connected at their lower ends by a rod 52, extend through the guides and carry at their upper ends a detachable cross bar 53 which carries the transverse cutting knife 47. A block 54 loosely mounted on rod 52 between a pair of thrust collars, is slidable in a horizontal guide 55 fixed to the end of follower 56 slidably mounted in a bearing 57 in gear case 3 and carrying, at its lower end, a roller 58 disposed in a cam groove 60 in a rotatably mounted cam 59 whereby a vertical reciprocating motion may be imparted to the follower 56, guide 55 and plungers 51 consequently to the transverse cutting knife.

A rocker arm 61, fulcrumed on the frame at 62, is slidably connected, at one end, with a block 63 in which a cylindrical bar 64 is rotatably mounted. A pin 65, eccentric to the bar and fixed therein, extends through the bar, has its bearings in lugs 66 depending from the cutter frame, and is held in position by nuts 67. The cylinder is provided with an angular head 68 by which it may be rotated after a nut 67 is loosened, and it may be locked in position by tightening the nut. This permits accurate adjustment to insure stopping the advance of the cutter frame at the precise point required. The lower end of lever 61 has a slotted connection at 69 with another follower 70 mounted in a bearing 71 in the gear case and carrying at its inner end a roller 72 disposed in cam groove 60. The cam groove is curved so that, when the cam is rotated, the transverse cutting knife being in its upward and rearward position, the knife will be lowered to make the cut, the cutter frame advanced so that the knife will push the severed block of cream into range of the splitting knife or knives, the transverse knife raised, and the cutter frame retracted to bring the knife into its rearward and upward position.

The splitting knife 73 is mounted in a boss 75 on a reversed U-shaped frame 74 secured to the frame of the machine. To guard against the tendency of the cream to adhere to the transverse knife when it is raised, a plate 76 is adjustably secured under the upper part of frame 74 by bolts 77.

Power from the motor is transmitted through a worm shaft 78 meshing with a worm wheel 79, fixed to a shaft 80 to which cam 59 is also fixed. Shaft 80 extends outside the gear case and carries at its outer end a hub 81 having an eccentric pin 82 enclosed by a roller 83 disposed in a slot 85 in a rocker arm 84 fulcrumed at 86 and provided, at its upper end, with a series of holes 87 adapted to receive a spring-pressed pin 88 carried by a link 89. The link is pivotally connected at 90 to a rocker arm 91 which is pivotally connected at 92 to a bracket 93 fixed to the machine frame. At its other end the rocker arm is bifurcated to embrace the end of feed arm 15 and is held in connection therewith by a spacer 94, between a pair of collars 95 and a nut 96. For nicety of adjustment the link includes a turn-buckle 97.

For setting the machine to cut bricks of different length the only adjustments required are to rotate the feed arm by means of knob 28 to bring the required series of notches into range with the ratchet pawl, and to correspondingly adjust the throw of pitman 89 by means of spring pin 88. Action of rocker arm 91 will then impart a forward movement of the required length to the feed arm which will, through the ratchet pawl and pusher arm, impart a like movement to the slab. The transverse knife will be forced down to sever the slab by downward movement of follower 56 and its connections, cutter frame 48 will be advanced, by outward movement of follower 70 and the action of rocker arm 61, to push the severed block into range of the splitting knife, knife 47 will then be raised by upward movement of follower 56, the cutter frame will be retracted by inward movement of follower 70, and the knife will be in position for another cut.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In an ice cream brick cutter including cutting mechanism, a table; means for guiding an ice cream slab thereon; a pusher arm adapted to propel the slab; a ratchet pawl carried by the pusher arm; a slidably and rotatably mounted feed arm provided with longitudinal series of spaced notches having shoulders adapted to engage the ratchet pawl, the notches in each series being differently spaced from those in the other series; means for rotating the feed arm to bring a selected series of notches into alignment with the ratchet pawl; a hub splined to one end of the feed arm, mounted in a bearing on the frame and provided with holes spaced to register with the respective series of notches; a spring pressed pin adapted to engage in a selected hole; means for reciprocating the feed arm, and means for adjusting its throw.

2. In an ice cream brick cutter including cutting mechanism, a table; means for guiding an ice cream slab thereon; a pusher arm adapted to propel the slab; a ratchet pawl carried by the pusher arm; a slidably and rotatably mounted feed arm provided with longitudinal series of spaced notches having shoulders adapted to engage the ratchet pawl, the notches in each series being differently spaced from those in the other series; means at one end of the feed arm for rotating it and locking it in selected positions; a rocker arm engaging the other end of the feed arm, the feed arm being rotatably seated therein; means for imparting movement to the rocker arm, and means for varying its throw.

3. In an ice cream brick cutter having cutting mechanism, a table; means for guiding an ice cream slab thereon; a pusher arm adapted to propel the slab; a guide bar extending longitudinally of the table; a sleeve fixed to the pusher arm and adapted to travel on the guide bar; a ratchet pawl carried by the sleeve; a slidably mounted feed arm provided with spaced notches having shoulders adapted to engage the ratchet pawl; means for imparting reciprocatory movement to the feed arm; means normally holding the sleeve against rearward movement, and a collar fixed to the feed arm having a series of steps arranged in different positions axially and peripherally to correspond with the racks on the feed arm whereby the ratchet pawl will be automatically disengaged when it reaches the limit of its forward movement.

4. In an ice cream brick cutter having cutting mechanism, a table; means for guiding an ice cream slab therein; a pusher arm adapted to propel the slab; a rectangular guide bar extending longitudinally of the table and having a longitudinal rack; a sleeve fixed to the pusher arm and adapted to travel on the guide bar; a pawl carried by the sleeve adapted to engage with the rack and prevent rearward movement of the sleeve; a slidably mounted feed arm provided with spaced notches having shoulders adapted to engage a ratchet pawl carried by the pusher arm sleeve; means for imparting reciprocatory movement to the feed arm; means for raising the ratchet pawl as the sleeve reaches the end of its forward movement; a link connecting the ratchet pawl and the pawl which engages the rack whereby the latter will be disengaged when the ratchet pawl is raised; a pin extending from the ratchet pawl, and a spring-pressed dog pivotally mounted on the sleeve and having at its free end a lug normally engaging the pin and holding the dog in retracted position but adapted when the ratchet pawl is raised to take under the pin and hold the pawl in raised position.

5. In an ice cream brick cutter having cutting mechanism, a table; means for guiding an ice cream slab therein; a pusher arm adapted to propel the slab; a rectangular guide bar extending longitudinally of the table and having a longitudinal rack; a sleeve fixed to the pusher arm and adapted to travel on the guide bar; a pawl carried by the sleeve adapted to engage with the rack and prevent rearward movement of the sleeve; a slidably mounted feed arm provided with spaced notches having shoulders adapted to engage a ratchet pawl carried by the pusher arm sleeve; means for imparting reciprocatory movement to the feed arm; means for raising the ratchet pawl as the sleeve reaches the end of its forward movement; a link connecting the ratchet pawl and the pawl which engages the rack whereby the latter will be disengaged when the ratchet pawl is raised; a pin extending from the ratchet pawl; a spring-pressed dog pivotally mounted on the sleeve and having at its free end a lug normally engaging the pin and holding the dog in retracted position but adapted when the ratchet pawl is raised to take under the pin and hold the pawl in raised position; a crank arm having its bearings in the frame of the machine and adapted to be swung into position to engage the dog and thereby release the ratchet pawl, and means for locking the crank arm in its active position.

6. In an ice cream brick cutter, a frame; a table thereon; means for guiding a slab thereon; means for imparting a step by step movement to the slab; a cutter frame slidable in the machine frame; vertical guides carried by the cutter frame; rods slidable in the guides; a cross bar connecting the upper ends of the rods; a knife carried by the cross bar; a horizontal rod connecting the lower ends of the vertical rods; a block carried by the horizontal rod; a horizontal guide embracing the block; a follower supporting the guide, and means for imparting reciprocatory motion to the follower.

7. In an ice cream brick cutter, a frame; a table carried thereby; means for guiding a slab thereon; means for imparting a step by step movement to the slab; a cutter frame slidable in the machine frame and carrying a knife; means for imparting intermittent vertical movement to the knife; a rocker arm connected at one end with the cutter frame; a follower connected with the other end of the rocker arm, and means for imparting reciprocatory motion to the follower.

8. In an ice cream brick cutter, a frame; a table carried thereby; means for guiding a slab thereon; means for imparting a step by step movement to the slab; a cutter frame slidable in the machine frame and carrying a knife; means for imparting intermittent vertical movement to the knife; a rocker arm connected at one end with the cutter frame; a follower connected with the other end of the rocker arm; means for imparting reciprocatory motion to the follower, and means for adjusting the position of the cutter frame relatively to the rocker arm.

9. In an ice cream brick cutter, a frame; a table thereon; means for guiding a slab on the table; means for imparting a step by step movement to the slab; a cutter frame slidable in the machine frame; vertical guides carried by the cutter frame; rods slidable in the guides; a knife carried by the rods; a horizontal rod connecting the lower ends of the vertical rods; a block carried by the horizontal rod; a horizontal guide embracing the block; a vertical follower supporting the guide; a rocker arm connected at one end with the cutter frame; a horizontal follower connected with the other end of the rocker arm, and common means for imparting reciprocatory movement to the followers.

10. In an ice cream brick cutter, a frame; a table thereon; means for guiding a slab on the table; means for imparting a step by step movement to the slab; a cutter frame slidable in the machine frame; vertical guides carried by the cutter frame; rods slidable in the guides; a knife carried by the rods; a horizontal rod connecting the lower ends of the vertical rods; a block carried by the horizontal rod; a horizontal guide embracing the block; a vertical follower supporting the guide; a rocker arm connected at one end with the cutter frame; a horizontal follower connected with the other end of the rocker arm; a rotatable cam adapted to impart intermittent reciprocatory motion to the vertical and horizontal followers, and means for rotating the cam.

11. In an ice cream brick cutter having cutting mechanism, a table; means for guiding a slab thereon; a pusher arm adapted to engage the rear end of the slab; a slidably mounted feed arm; connections between the feed arm and the pusher whereby reciprocatory movement of the feed arm will impart intermittent movement to the pusher arm; a rocker arm; means for imparting rocking movement thereto; a rocker arm engaging the feed arm, and a link adjustably connected with the first mentioned rocker arm and pivotally connected with the last mentioned rocker arm whereby the throw of the feed arm may be adjusted.

In testimony whereof I have signed my name to this specification.

AMOS F. GANTZ.